United States Patent
Zhao

(10) Patent No.: US 10,791,069 B2
(45) Date of Patent: Sep. 29, 2020

(54) METHOD, APPARATUS, AND STORAGE MEDIUM FOR PROCESSING DATA WITH MULTIPLE CLIENTS HAVING FRIEND ASSOCIATION RELATIONSHIP

(71) Applicant: Tencent Technology (Shenzhen) Company Limited, Shenzhen, Guangdong (CN)

(72) Inventor: Na Zhao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 21 days.

(21) Appl. No.: 15/695,852

(22) Filed: Sep. 5, 2017

(65) Prior Publication Data
US 2017/0366486 A1    Dec. 21, 2017

Related U.S. Application Data

(63) Continuation of application No. PCT/CN2016/082675, filed on May 19, 2016.

(30) Foreign Application Priority Data
Jul. 9, 2015 (CN) .......................... 2015 1 0400862

(51) Int. Cl.
*H04L 12/58* (2006.01)
*G06F 9/50* (2006.01)
(Continued)

(52) U.S. Cl.
CPC ............ *H04L 51/04* (2013.01); *G06F 9/5011* (2013.01); *H04L 12/185* (2013.01);
(Continued)

(58) Field of Classification Search
CPC .. A63F 13/795; A63F 2300/556; H04L 51/04; H04L 51/046
See application file for complete search history.

(56) References Cited

U.S. PATENT DOCUMENTS 7,819,749 B1 * 10/2010 Fish ..................... G07F 17/3227
463/42
7,828,661 B1 * 11/2010 Fish ........................ A63F 13/87
463/42
(Continued)

FOREIGN PATENT DOCUMENTS

CN      101075941 A     11/2007
CN      101155044 A     4/2008
(Continued)

OTHER PUBLICATIONS

Copy of ISR and Written Opinion corresponding to PCT Application No. PCT/CN2016/082675, dated Aug. 2, 2016, 11 pages.
(Continued)

*Primary Examiner* — Jeong S Park
(74) *Attorney, Agent, or Firm* — Brinks Gilson & Lione

(57) ABSTRACT

A data processing method and a server are disclosed. The method includes: receiving, by a server, first service data that is sent by a first client (for example, an instant messaging application based client), and sending the first service data to at least one second client that has a friend association relationship with the first client; detecting one or more second clients responding to the first service data, selecting, according to a preset selection rule, a target second client, and assigning a processing permission to the target second client, so that the target second client generates second service data according to the processing permission and the first service data; and receiving the second service data, using the target second client as a first client, and using the
(Continued)

second service data as first service data. The present disclosure can improve utility of an instant messaging application and enhance user stickiness.

15 Claims, 6 Drawing Sheets

(51) Int. Cl.
*H04L 12/18* (2006.01)
*A63F 13/795* (2014.01)

(52) U.S. Cl.
CPC .......... *H04L 51/046* (2013.01); *A63F 13/795* (2014.09); *A63F 2300/556* (2013.01)

(56) References Cited

U.S. PATENT DOCUMENTS

| | | | |
|---|---|---|---|
| 8,656,151 B2* | 2/2014 | Yan | H04L 63/06 380/251 |
| 2005/0209001 A1* | 9/2005 | Moshal | G07F 17/32 463/42 |
| 2006/0176831 A1 | 8/2006 | Greenberg et al. | |
| 2010/0093443 A1* | 4/2010 | Yan | H04L 67/1002 463/42 |
| 2010/0146271 A1* | 6/2010 | Yan | H04L 63/06 713/167 |
| 2011/0282965 A1 | 11/2011 | Dodson | |
| 2014/0025768 A1 | 1/2014 | Huston et al. | |

FOREIGN PATENT DOCUMENTS

| | | |
|---|---|---|
| CN | 101188574 A | 5/2008 |
| CN | 201278148 Y | 7/2009 |
| CN | 101505311 A | 8/2009 |
| CN | 104468332 A | 3/2015 |
| CN | 104683961 A | 6/2015 |
| JP | 2014-106873 A | 6/2014 |
| KR | 10-2004-0050655 | 6/2004 |
| KR | 10-2009-0113638 | 11/2009 |

OTHER PUBLICATIONS

Office Action dated Nov. 29, 2018 for Korean Application No. 10-2017-7032723, 5 pages.
Office Action dated May 22, 2019 for Korean Application No. 10-2017-7032723, 5 pages.
Office Action dated May 28, 2019 for Chinese Application No. 201510400862.8 with concise English Translation, 8 pages.

* cited by examiner

METHOD, APPARATUS, AND STORAGE MEDIUM FOR PROCESSING DATA WITH MULTIPLE CLIENTS HAVING FRIEND ASSOCIATION RELATIONSHIP

RELATED APPLICATION

This application is a continuation application of PCT Patent Application No. PCT/CN2016/082675, filed on May 19, 2016, which claims priority to Chinese Patent Application No. 201510400862.8, filed with the Chinese Patent Office on Jul. 9, 2015, both of which are incorporated herein by reference in their entireties.

FIELD OF THE TECHNOLOGY

The present disclosure relates to the field of computer technologies, and in particular, to a data service processing method and a server.

BACKGROUND OF THE DISCLOSURE

Instant messaging (Instant messaging, IM) is currently one of the most popular Internet communication manners. As various instant messaging software springs up, service providers provide more types of communication service functions. There is no doubt that the Internet has become a real information superhighway. From the perspective of an actual engineering application, with the instruction of computer network principles, and with reference to some currently commonly-used network technologies, programming implementation of C/S architecture-based network chatting tool is feasible. An instant messaging application can allow two or more people to use a network to transmit text messages, documents, voices, and the like in real time, and perform video communication.

However, a current instant messaging application is still only a tool for chatting between users through texts or videos. When a user is not intended to chat, the user may not use a current instant messaging application. Consequently, utility of the instant messaging application is reduced, and user stickiness is reduced.

SUMMARY

Embodiments of the present disclosure provide a data processing method and a server, to improve utility of an instant messaging application and enhance user stickiness.

According to a first aspect of the present disclosure, a data processing method is provided, including:

receiving, by a server comprising a memory and a processor in communication with the memory, first service data that is sent by a first client;

sending, by the server, the first service data to at least one second client that has a friend association relationship with the first client;

detecting, by the server, one or more second clients in the at least one second client responding to the first service data;

selecting, by the server according to a selection rule, a target second client from the one or more second clients responding to the first service data;

assigning, by the server, a processing permission to the target second client, so that the target second client generates second service data according to the processing permission and the first service data;

receiving, by the server, the second service data generated by the target second client; and using the target second client as a first client and using the second service data as first service data.

According to a second aspect of the present disclosure, a server is provided, including:

a memory storing instructions;

a processor in communication with the memory, wherein, when the processor executes the instructions, the processor is configured to cause the server to:

receive first service data that is sent by a first client;

send the first service data to at least one second client that has a friend association relationship with the first client;

detect one or more second clients in the at least one second client responding to the first service data;

select, according to a selection rule, a target second client from the one or more second clients responding to the first service data;

assign a processing permission to the target second client, so that the target second client generates second service data according to the processing permission and the first service data;

receive the second service data generated by the target second client; and use the target second client as a first client and use the second service data as first service data.

The disclosure also discloses a non-transitory computer readable storage medium storing computer readable instructions, the computer readable instructions, when executed by a processor, causing the processor to perform:

receiving first service data that is sent by a first client;

sending the first service data to at least one second client that has a friend association relationship with the first client;

detecting one or more second clients in the at least one second client responding to the first service data;

selecting, according to a selection rule, a target second client from the one or more second clients responding to the first service data;

assigning a processing permission to the target second client, so that the target second client generates second service data according to the processing permission and the first service data;

receiving the second service data generated by the target second client; and using the target second client as a first client and using the second service data as first service data.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
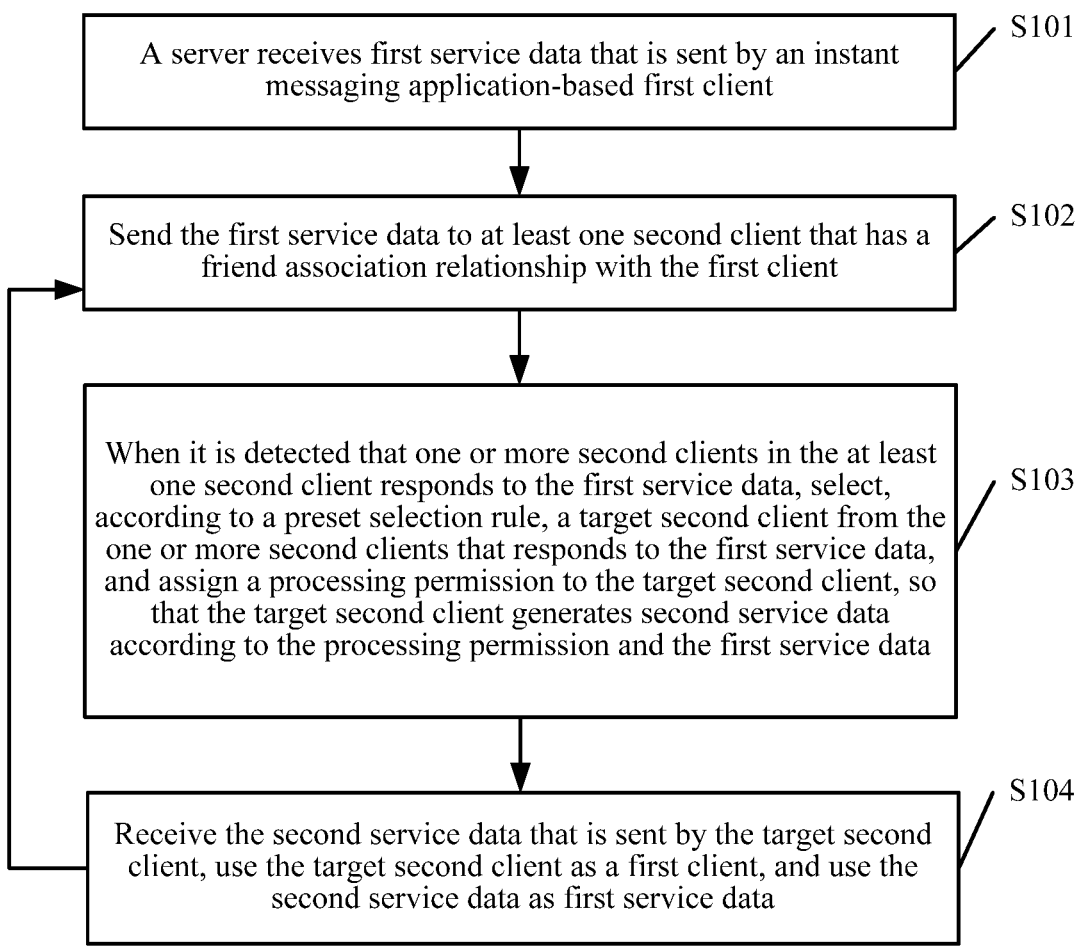
FIG. 1 is a schematic flowchart of a data processing method according to an embodiment of the present disclosure.

Referring to FIG. 1, FIG. 1 is a schematic flowchart of a data processing method according to an embodiment of the present disclosure. The method may include S101 to S104. Specifically:

S101: A server receives first service data that is sent by a first client. The first client may be an instant messaging application-based client.

Specifically, the server may be a daemon server of an instant messaging application and includes a CPU or processor and a memory in communication with the processor. The memory has stored therein executable instructions for the processor. The server may be responsible for processing and forwarding information initiated by an instant messaging application-based client. The server may receive first service data that is sent by an instant messaging application-based first client. The first service data may be a game service, for example, a game service of "idioms solitaire". The first client may be an initiator or a participant of the game service.

S102: Send the first service data to at least one second client that has a friend association relationship with the first client.

Specifically, after receiving the first service data, the server may first obtain information about at least one second client that has a friend association relationship with the first client, and then sends the first service data to the at least one second client according to the information about the at least one second client. A manner of obtaining the information about the at least one second client may include: After receiving the first service data that is sent by the instant messaging application-based first client, the server may search for a local buddy list that corresponds to the first client, and extract information about at least one second client from the buddy list. In this manner, an object to which the first service data is transmitted can be selected totally by the server. Alternatively, while receiving the first service data that is sent by the instant messaging application-based first client, the server may further receive information about at least one second client that is selected by and that has a friend association relationship with the first client. That is, a user of the first client can autonomously select a part of or all information about at least one second client from the buddy list.

S103: When it is detected that one or more second clients in the at least one second client respond to the first service data, select, according to a preset selection rule, a target second client from the one or more second clients that respond to the first service data, and assign a processing permission to the target second client, so that the target second client generates second service data according to the processing permission and the first service data.

Specifically, when it is detected that a second client in the at least one second client responds to the first service data, the server can select, according to a preset selection rule, a target second client from the second client that responds to the first service data. The selection rule may be: selecting a second client that is the first one to respond to the first service data. In this case, the target second client is a second client that is the first one to respond to the first service data. The selection rule may further be: selecting second clients that are the first two to respond to the first service data, or may be another customized rule, and details are not described herein. After selecting the target second client, the server may assign a processing permission to the target second client, so that the target second client generates second service data according to the processing permission and the first service data. For example, in the current game service of "idioms solitaire", the first service data is "feng ping Lang jing". If a second client is the first one to respond to the first service data, the second client is determined by the server as a target second client, and obtains a processing permission that is assigned by the server. In this way, the target second client can perform idioms solitaire on the "feng ping Lang jing" according to the processing permission, to obtain second service data, "jing guan qi bian". A second client to which the processing permission is not assigned does not have a permission of performing idioms solitaire on the "feng ping Lang jing".

S104: Receive the second service data that is sent by the target second client, use the target second client as a first client, and use the second service data as first service data.

Specifically, after the target second client generates second service data, the target second client may submit the second service data. In this case, the server can receive the second service data that is sent by the target second client, and then uses the target second client as a first client and the second service data as first service data, so that the blocks of S102 to S104 are repeated. The server does not stop transmitting first service data until a service stop condition is satisfied. The service stop condition may be that a quantity of clients that are used as the first clients reaches a preset quantity threshold, or that duration from a start of a service to a current time reaches a preset duration threshold, or may be another customized condition. For example, when the initial first client initiates a game service of idioms solitaire, the initial first client may randomly or autonomously create the first idiom, to be used as first service data, and sends, by using the server, the first service data to a second client that corresponds to a user that is in a buddy list of the first client. A second client that is the first one to respond to the first service data can have a permission to perform idioms solitaire on the first service data, to obtain the second idiom. The second client becomes a new first client, and the second idiom becomes new first service data. The server is caused to continually send the new first service data to a second client that has a friendship with the new first client, to obtain the third idiom. The third idiom further becomes new first service data. The rest can be deduced by analogy. In this way, the game service of idioms solitaire can be implemented by multiple clients in an instant messaging application, that is, multiple times of transmission of first service data are implemented. Pieces of the service data transmitted at different time points may be different from each other. In such a game service, more clients can participate in a process of idioms solitaire, thereby improving utility of an instant messaging application and enhancing user stickiness.

In this embodiment of the present disclosure, a server sends first service data that is sent by a first client to at least one second client that has a friend association relationship with the first client. When it is detected that a one or more second clients in the at least one second client respond to the first service data, the server can select, according to a preset selection rule, a target second client from the one or more second clients that respond to the first service data, and assign a processing permission to the target second client, so that the target second client generates second service data according to the processing permission and the first service data. Then, the server receives the second service data that is sent by the target second client, uses the target second client as a first client, and uses the second service data as first service data, so that first service data can be transmitted continually. In this way, more clients can participate in processing first service data, thereby improving utility of an instant messaging application and enhancing user stickiness.

Figure 2:
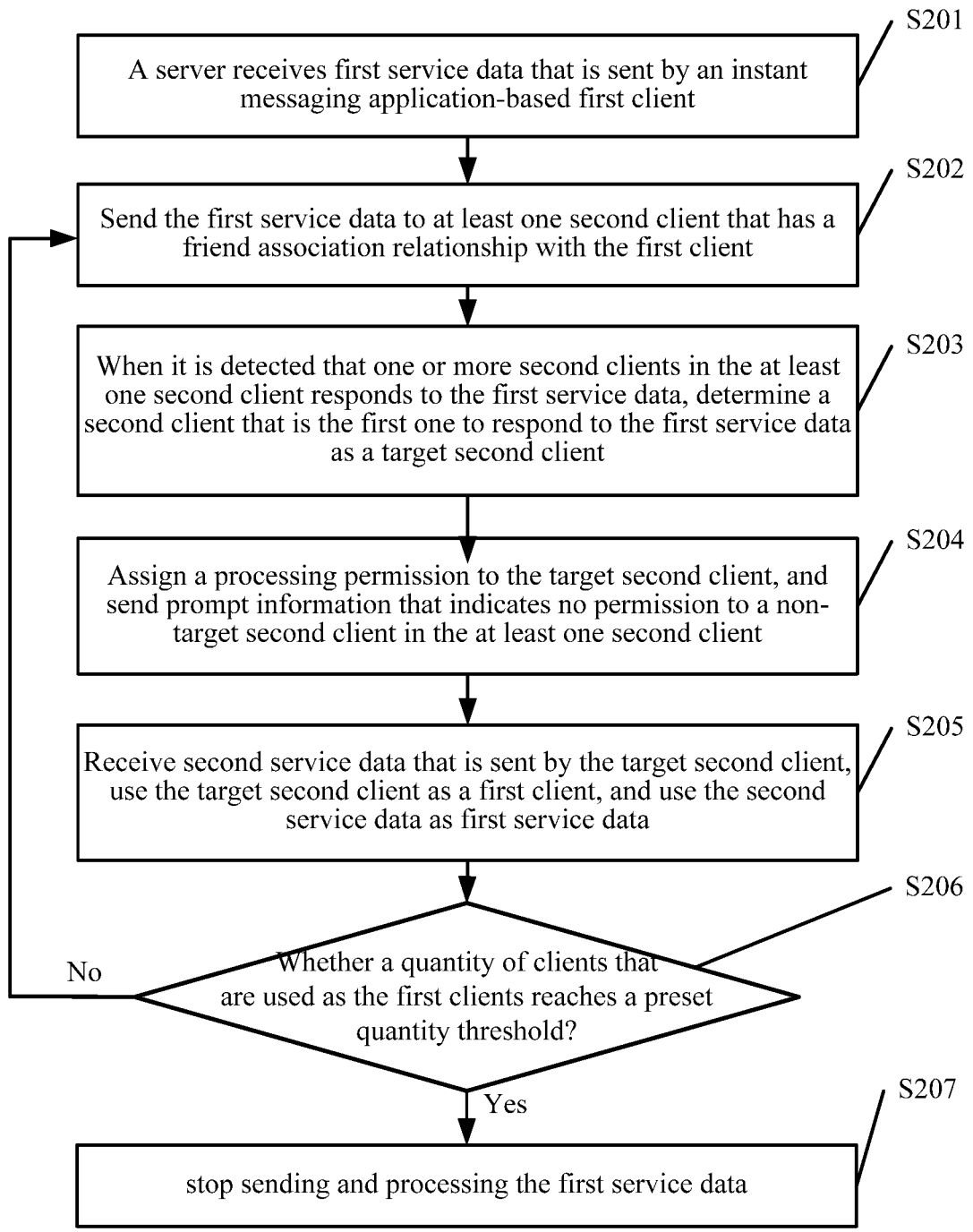
FIG. 2 is a schematic flowchart of another data processing method according to an embodiment of the present disclosure.

Referring to FIG. 2, FIG. 2 is a schematic flowchart of another data processing method according to an embodiment of the present disclosure. The method may include S201 to S207.

S201: A server receives first service data that is sent by an instant messaging application-based first client.

Specifically, the server may be a daemon server of an instant messaging application, and is responsible for processing and forwarding information initiated by an instant messaging application-based client. The server may receive first service data that is sent by an instant messaging application-based first client. The first service data may be a game service, for example, a game service of "idioms solitaire". The first client may be an initiator or a participant of the game service.

S202: Send the first service data to at least one second client that has a friend association relationship with the first client.

Specifically, after receiving the first service data, the server may first obtain information about at least one second client that has a friend association relationship with the first client, and then sends the first service data to the at least one second client according to the information about the at least one second client. A manner of obtaining the information about the at least one second client may include: After receiving the first service data that is sent by the instant messaging application-based first client, the server may search for a local buddy list that corresponds to the first client, and extract information about at least one second client from the buddy list. In this manner, an object to which the first service data is transmitted can be selected totally by the server. Alternatively, while receiving the first service data that is sent by the instant messaging application-based first client, the server may further receive information about at least one second client that is selected by and that has a friend association relationship with the first client. That is, a user of the first client can autonomously select a part of or all information about at least one second client from the buddy list.

S203: When it is detected that a one or more second clients in the at least one second client respond to the first service data, determine a second client of the one or more second clients that is the first one to respond to the first service data as a target second client.

Specifically, when it is detected that a one or more second clients in the at least one second client responds to the first service data, the server can select, according to a preset selection rule, a target second client from the one or more second clients that respond to the first service data.

S204: Assign a processing permission to the target second client, and send prompt information that indicates no permission to a non-target second client in the at least one second client. The non-target second client could be any second client or all second clients of the at least one second client except the target second client.

Specifically, after the server selects the target second client, the server may assign a processing permission to the target second client, so that the target second client generates second service data according to the processing permission and the first service data. While assigning a processing permission, the server may further send prompt information that indicates no permission to a non-target second client in the at least one second client. That is, the non-target second client cannot obtain the processing permission. That is, the non-target second client cannot process the first service data. The non-target second client may be all second clients of the at least one second client except the target second client. For example, in the current game service of "idioms solitaire", the first service data is "feng ping Lang jing". If a second client is the first one to respond to the first service data, the second client is determined by the server as a target second client, and obtains a processing permission that is assigned by the server. In this way, the target second client can perform idioms solitaire on the "feng ping Lang jing" according to the processing permission, to obtain second service data, "jing guan qi bian". A second client to which the processing permission is not assigned does not have a permission of performing idioms solitaire on the "feng ping Lang jing".

S205: Receive second service data that is sent by the target second client, use the target second client as a first client, and use the second service data as first service data.

Specifically, after the target second client generates second service data, the target second client may submit the second service data. In this case, the server can receive the second service data that is sent by the target second client, and then uses the target second client as a first client and the second service data as first service data, so that the blocks of S202 to S205 are repeated. The server does not stop transmitting first service data until a service stop condition is satisfied. The service stop condition may be that a quantity of clients that are used as the first clients reaches a preset quantity threshold, or that duration from a start of a service to a current time reaches a preset duration threshold, or may be another customized condition. For example, when the first client initiates a game service of idioms solitaire, the first client may randomly or autonomously create the first idiom, to be used as first service data, and sends, by using the server, the first service data to a second client that corresponds to a user that is in a buddy list of the first client. A second client that is the first one to respond to the first service data can have a permission to perform idioms solitaire on the first service data, to obtain the second idiom. The second client becomes a new first client, and the second idiom becomes new first service data. The server is caused to continually send the new first service data to a second client that has a friendship with the new first client, to obtain the third idiom. The third idiom further becomes new first service data. The rest can be deduced by analogy. In this way, the game service of idioms solitaire can be implemented by multiple clients in an instant messaging application, that is, multiple times of transmission of first service data are implemented. Pieces of first service data transmitted at different time points may be different from each other. In such a game service, more clients can participate in a process of idioms solitaire, thereby improving utility of an instant messaging application and enhancing user stickiness.

S206: The server determine whether a quantity of clients that are used as the first clients reaches a preset quantity threshold. When the quantity of clients that are used as the first clients reaches the preset quantity threshold, the server may perform block S207: stop sending and processing the first service data. When the quantity of clients that are used as the first clients does not reach the preset quantity threshold, in response to using the target second client as a first client and using the second service data as first service data, the blocks of S202 to S205 are repeated.

Specifically, the server may collect, in real time, statistics of a quantity of clients that are used as the first clients. When it is found that the quantity of the clients that are used as the first clients reaches a preset quantity threshold, the server stops sending and processing the first service data, that is, the server stops a circulation from S202 to S205, to end the round of game service.

Optionally, a process of the game service further includes: receiving a view request that is sent by a client that participates in processing the first service data, and sending, according to the view request, information about all clients that are used as the first clients to the client that participates in processing the first service data. For example, when the game service of idioms solitaire ends, it is found that there are five clients that have participated in the game service. When one of the clients sends a view request to the server, the server may send information about the other four clients and five idioms that are generated in the game service to the client that initiates the view request, so that the client can view a result of the game service, and can initiates a friend request according to the information about the other four clients, to further ensure user stickiness.

In this embodiment of the present disclosure, a server sends first service data that is sent by a first client to at least one second client that has a friend association relationship with the first client. When it is detected that a second client in the at least one second client responds to the first service data, the server can select, according to a preset selection rule, a target second client from the second client that responds to the first service data, and assign a processing permission to the target second client, so that the target second client generates second service data according to the processing permission and the first service data. Then, the server receives the second service data that is sent by the target second client, uses the target second client as a first client, and uses the second service data as first service data, so that first service data can be transmitted continually. In this way, more clients can participate in processing first service data, thereby improving utility of an instant messaging application and enhancing user stickiness.

Figure 3:
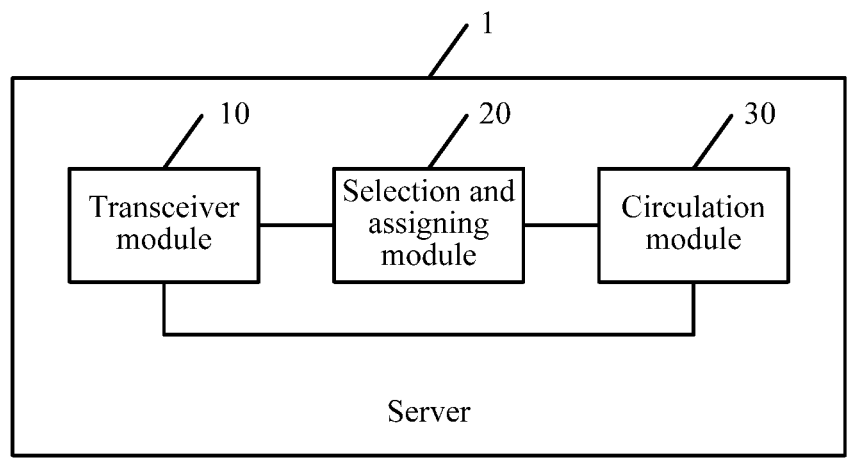
FIG. 3 is a schematic structural diagram of a server according to an embodiment of the present disclosure.

Referring to FIG. 3, FIG. 3 is a schematic structural diagram of a server according to an embodiment of the present disclosure. The server 1 may include: a transceiver module 10, a selection and assigning module 20, and a circulation module 30.

The transceiver module 10 is configured to: receive first service data that is sent by an instant messaging application-based first client, and send the first service data to at least one second client that has a friend association relationship with the first client.

Specifically, the server 1 may be a daemon server of an instant messaging application, and is responsible for processing and forwarding information initiated by an instant messaging application-based client. The transceiver module 10 may receive first service data that is sent by an instant messaging application-based first client. The first service data may be a game service, for example, a game service of "idioms solitaire". The first client may be an initiator or a participant of the game service.

After receiving the first service data, the transceiver module 10 may first obtain information about at least one second client that has a friend association relationship with the first client, and then sends the first service data to the at least one second client according to the information about the at least one second client. A manner of obtaining, by the transceiver module 10, the information about the at least one second client may include: After receiving the first service data that is sent by the instant messaging application-based first client, the transceiver module 10 may search for a local buddy list that corresponds to the first client, and extract information about at least one second client from the buddy list. In this manner, an object to which the first service data is transmitted can be selected totally by the server 1. Alternatively, while receiving the first service data that is sent by the instant messaging application-based first client, the transceiver module 10 may further receive information about at least one second client that is selected by and that has a friend association relationship with the first client. That is, a user of the first client can autonomously select a part of or all information about at least one second client from the buddy list.

The selection and assigning module 20 is configured to: when it is detected that one or more second clients in the at least one second client responding to the first service data, select, according to a preset selection rule, a target second client from the one or more second clients responding to the first service data, and assign a processing permission to the target second client, so that the target second client generates second service data according to the processing permission and the first service data.

Specifically, when it is detected that a second client in the at least one second client responds to the first service data, the selection and assigning module 20 can select, according to a preset selection rule, a target second client from the second client that responds to the first service data. The selection rule may be: selecting a second client that is the first one to respond to the first service data. In this case, the target second client is a second client that is the first one to respond to the first service data. The selection rule may further be: selecting second clients that are the first two to respond to the first service data, or may be another customized rule, and details are not described herein. After selecting the target second client, the selection and assigning module 20 may assign a processing permission to the target second client, so that the target second client generates second service data according to the processing permission and the first service data. For example, in the current game service of "idioms solitaire", the first service data is "feng ping lang jing". If a second client is the first one to respond to the first service data, the second client is determined by the selection and assigning module 20 as a target second client, and obtains a processing permission that is assigned by the selection and assigning module 20. In this way, the target second client can perform idioms solitaire on the "feng ping lang jing" according to the processing permission, to obtain second service data, "jing guan qi bian". A second client to which the processing permission is not assigned does not have a permission of performing idioms solitaire on the "feng ping Lang jing".

The circulation module 30 is configured to: receive the second service data that is sent by the target second client, use the target second client as a first client, and use the second service data as first service data.

Specifically, after the target second client generates second service data, the target second client may submit the second service data. In this case, the circulation module 30 can receive the second service data that is sent by the target second client, use the target second client as a first client, and use the second service data as first service data, to notify the transceiver module 10 and the selection and assigning module 20 to repeat the following blocks: sending the first service data to at least one second client that has a friend association relationship with the first client; when it is detected that a second client in the at least one second client responds to the first service data, selecting, according to a preset selection rule, a target second client from the second client that responds to the first service data, and assigning a processing permission to the target second client, so that the target second client generates second service data according to the processing permission and the first service data. Then, the circulation module 30 repeats the following blocks: receiving the second service data that is sent by the target second client, using the target second client as a first client, and using the second service data as first service data. The circulation module 30 does not stop transmitting first service data until a service stop condition is satisfied. The service stop condition may be that a quantity of clients that are used as the first clients reaches a preset quantity threshold, or that duration from a start of a service to a current time reaches a preset duration threshold, or may be another customized condition. For example, when the initial first client initiates a game service of idioms solitaire, the initial first client may randomly or autonomously create the first idiom, to be used as first service data, and sends, by using the transceiver module 10, the first service data to a second client that corresponds to a user that is in a buddy list of the initial first client. A second client that is the first one to respond to the first service data can have a permission to perform idioms solitaire on the first service data, to obtain the second idiom. The second client becomes a new first client, and the second idiom becomes new first service data. The transceiver module 10 is caused to continually send the new first service data to a second client that has a friendship with the new first client, to obtain the third idiom. The third idiom further becomes new first service data. The rest can be deduced by analogy. In this way, the game service of idioms solitaire can be implemented by multiple clients in an instant messaging application, that is, multiple times of transmission of first service data are implemented. Pieces of first service data transmitted at different time points may be different from each other. In such a game service, more clients can participate in a process of idioms solitaire, thereby improving utility of an instant messaging application and enhancing user stickiness.

Figure 4:
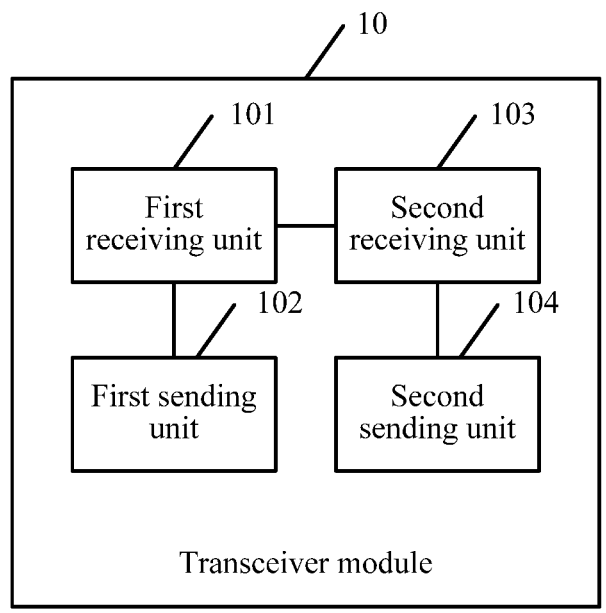
FIG. 4 is a schematic structural diagram of a transceiver module according to an embodiment of the present disclosure.

Further, referring to FIG. 4, FIG. 4 is a schematic structural diagram of a transceiver module 10 according to an embodiment of the present disclosure. The transceiver module 10 may include: a first receiving unit 101, a first sending unit 102, a second receiving unit 103, and a second sending unit 104.

The first receiving unit 101 is configured to: receive first service data that is sent by an instant messaging application-based first client, search for a local buddy list that corresponds to the first client, and extract information about at least one second client from the buddy list.

The first sending unit 102 is configured to send the first service data to the at least one second client according to the information about the at least one second client.

The second receiving unit 103 is configured to: receive first service data that is sent by an instant messaging application-based first client, and receive information about at least one second client that is selected by and that has a friend association relationship with the first client.

The second sending unit 104 is configured to send the first service data to the at least one second client according to the information about the at least one second client.

Specifically, when the first receiving unit 101 performs a corresponding operation, the first receiving unit 101 may notify the first sending unit 102 to send the first service data to the at least one second client according to the information about the at least one second client, and notify the second receiving unit 103 and the second sending unit 104 to stop operating. Likewise, when the second receiving unit 103 performs a corresponding operation, the second receiving unit 103 may notify the second sending unit 104 to send the first service data to the at least one second client according to the information about the at least one second client, and notify the first receiving unit 101 and the first sending unit 102 to stop operating. The first sending unit 102 and the second sending unit 104 may be a same unit.

Figure 5:
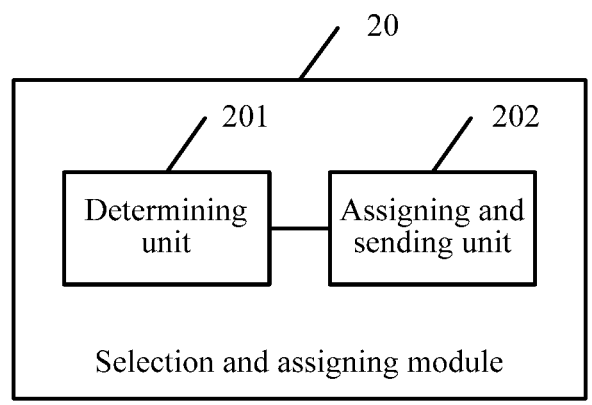
FIG. 5 is a schematic structural diagram of a selection and assigning module according to an embodiment of the present disclosure.

Further, referring to FIG. 5, FIG. 5 is a schematic structural diagram of a selection and assigning module 20 according to an embodiment of the present disclosure. The selection and assigning module 20 may include a determining unit 201 and an assigning and sending unit 202.

The determining unit 201 is configured to: when it is detected that a second client in the at least one second client responds to the first service data, determine a second client that is the first one to respond to the first service data as a target second client.

The assigning and sending unit 202 is configured to: assign a processing permission to the target second client, and send prompt information that indicates no permission to a non-target second client in the at least one second client.

Specifically, after the determining unit 201 selects the target second client, the assigning and sending unit 202 may assign a processing permission to the target second client, so that the target second client generates second service data according to the processing permission and the first service data. While assigning a processing permission, the sending unit 202 may further send prompt information that indicates no permission to a non-target second client in the at least one second client. That is, the non-target second client cannot obtain the processing permission. That is, the non-target second client cannot process the first service data. The non-target second client may be all second clients of the at least one second client except the target second client. For example, in the current game service of "idioms solitaire", the first service data is "feng ping Lang jing". If a second client is the first one to respond to the first service data, the second client is determined by the determining unit 201 as a target second client, and obtains a processing permission that is assigned by the assigning and sending unit 202. In this way, the target second client can perform idioms solitaire on the "feng ping Lang jing" according to the processing permission, to obtain second service data, "jing guan qi bian". A second client to which the processing permission is not assigned does not have a permission of performing idioms solitaire on the "feng ping Lang jing".

In this embodiment of the present disclosure, a server 1 sends first service data that is sent by a first client to at least one second client that has a friend association relationship with the first client. When it is detected that a second client in the at least one second client responds to the first service data, the server 1 can select, according to a preset selection rule, a target second client from the second client that responds to the first service data, and assign a processing permission to the target second client, so that the target second client generates second service data according to the processing permission and the first service data. Then, the server 1 receives the second service data that is sent by the target second client, uses the target second client as a first client, and uses the second service data as first service data, so that first service data can be transmitted continually. In this way, more clients can participate in processing first service data, thereby improving utility of an instant messaging application and enhancing user stickiness.

Figure 6:
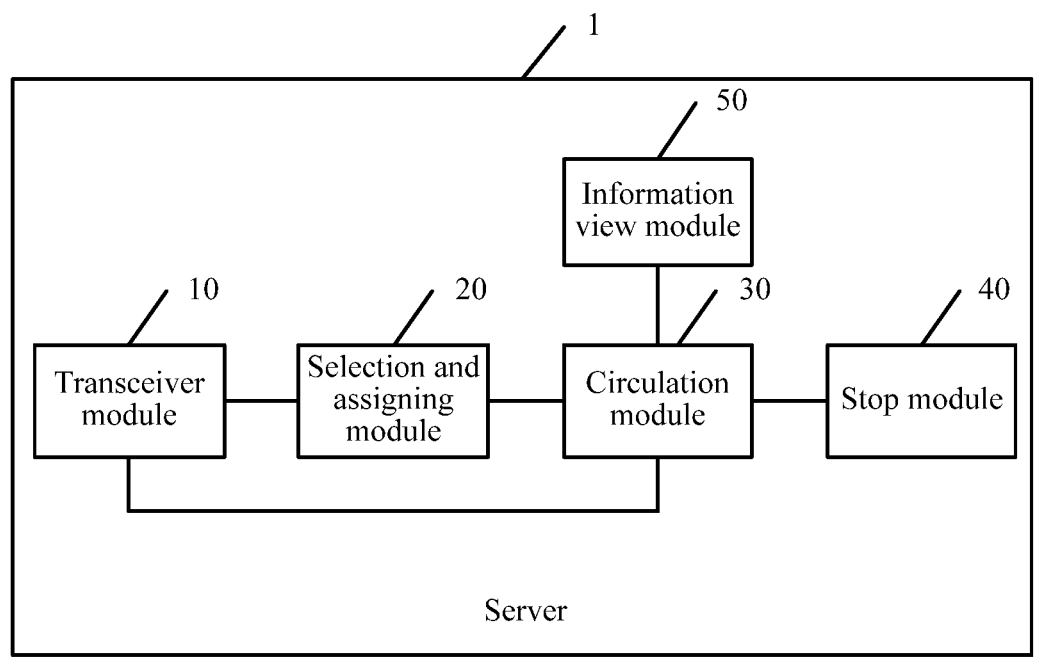
FIG. 6 is a schematic structural diagram of another server according to an embodiment of the present disclosure.

Further, referring to FIG. 6, FIG. 6 is a schematic structural diagram of another server according to an embodiment of the present disclosure. The server 1 may include the transceiver module 10, the selection and assigning module 20, and the circulation module 30 in the embodiment that corresponds to FIG. 3. Further, the server 1 may further include a stop module 40 and an information view module 50.

The stop module 40 is configured to: when it is found that a quantity of clients that are used as the first clients reaches a preset quantity threshold, stop sending and processing the first service data.

Specifically, the stop module 40 may collect, in real time, statistics of a quantity of clients that are used as the first clients. When it is found that the quantity of clients that are used as the first clients reaches a preset quantity threshold, the stop module 40 stops sending and processing the first service data, that is, the stop module 40 stops an circulation operation that is performed by the transceiver module 10, the selection and assigning module 20, and the circulation module 30, to end the round of game service.

The information view module 50 is configured to: receive a view request that is sent by a client that participates in processing the first service data, and send, according to the view request, information about all clients that are used as the first clients to the client that participates in processing the first service data.

For example, when the game service of idioms solitaire ends, it is found that there are five clients that have participated in the game service. When one of the clients sends a view request to the information view module 50, the information view module 50 may send information about the other four clients and five idioms that are generated in the game service to the client that initiates the view request, so that the client can view a result of the game service, and can initiates a friend request according to the information about the other four clients, to further ensure user stickiness.

In this embodiment of the present disclosure, a server 1 sends first service data that is sent by a first client to at least one second client that has a friend association relationship with the first client. When it is detected that a second client in the at least one second client responds to the first service data, the server 1 can select, according to a preset selection rule, a target second client from the second client that responds to the first service data, and assign a processing permission to the target second client, so that the target second client generates second service data according to the processing permission and the first service data. Then, the server 1 receives the second service data that is sent by the target second client, uses the target second client as a first client, and uses the second service data as first service data, so that first service data can be transmitted continually. In this way, more clients can participate in processing first service data, thereby improving utility of an instant messaging application and enhancing user stickiness.

Figure 7:
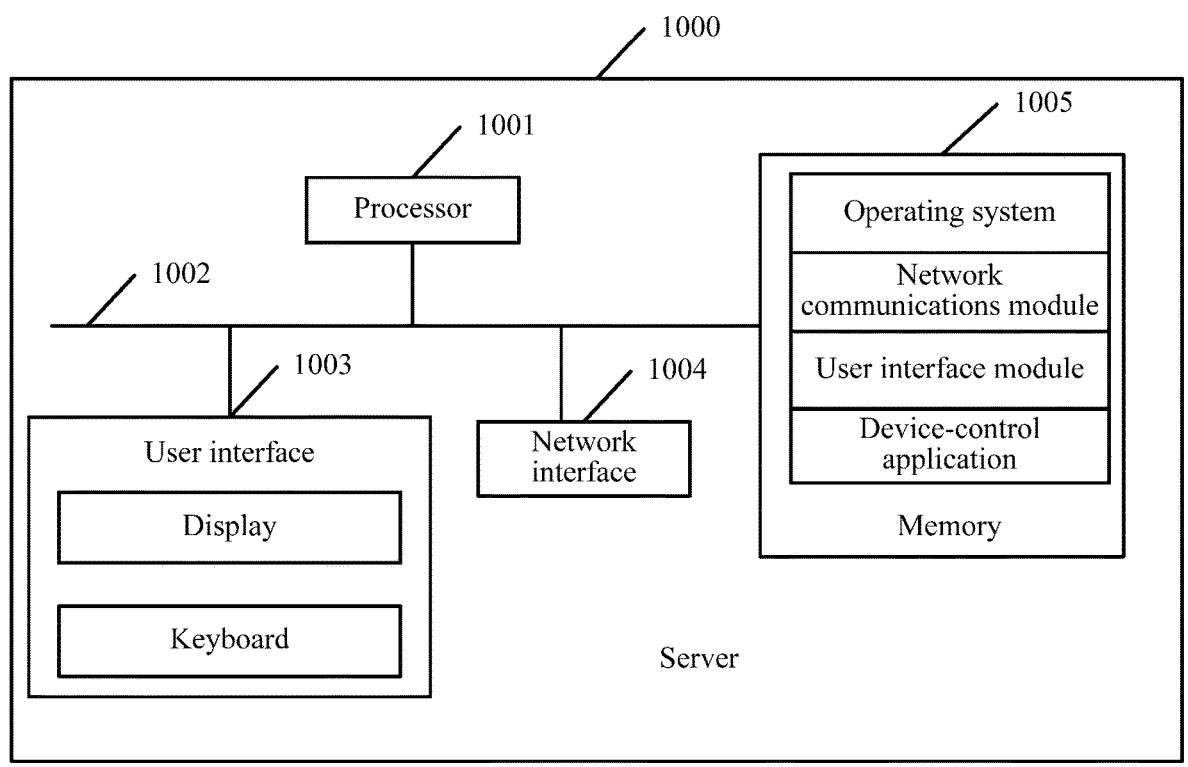
FIG. 7 is a schematic structural diagram of still another server according to an embodiment of the present disclosure.

Referring to FIG. 7, FIG. 7 is a schematic structural diagram of still another server according to an embodiment of the present disclosure. As shown in FIG. 7, the server 1000 may include: at least one processor 1001 (such as a CPU) and a memory 1005. Optionally, the server may further include at least one communications bus 1002, at least one network interface 1004, and a user interface 1003. The communications bus 1002 is configured to implement connection and communication between the components. The user interface 1003 may include a display and a keyboard. Optionally, the user interface 1003 may further include a standard wired interface and a standard wireless interface. Optionally, the network interface 1004 may include a standard wired interface and a standard wireless interface (such as a WI-FI interface). The memory 1005 may be a high-speed RAM memory, or a non-volatile memory (or non-transitory memory), such as at least one disk memory. Optionally, the memory 1005 may include at least one storage apparatus that is remotely disposed relative to the processor 1001. As shown in FIG. 7, the memory 1005 used as a computer storage medium may include an operating system, a network communications module, a user interface module, and a device-control application.

In the server 1000 shown in FIG. 7, the network interface 1004 is mainly configured to be connected to a client and perform data communication with the client. The user interface 1003 is mainly configured to provide an input interface for a user and obtain data output by the user. The processor 1001 may be configured to invoke the device-control application that is stored in the memory 1005 and specifically perform the following blocks:

receiving first service data that is sent by an instant messaging application-based first client, and sending the first service data to at least one second client that has a friend association relationship with the first client;

when it is detected that a second client in the at least one second client responds to the first service data, selecting, according to a preset selection rule, a target second client from the second client that responds to the first service data, and assigning a processing permission to the target second client, so that the target second client generates second service data according to the processing permission and the first service data; and receiving the second service data that is sent by the target second client, using the target second client as a first client, and using the second service data as first service data.

In an embodiment, the receiving, by the processor 1001, first service data that is sent by an instant messaging application-based first client, and sending the first service data to at least one second client that has a friend association relationship with the first client specifically includes the following blocks:

receiving, by the server, first service data that is sent by an instant messaging application-based first client, searching for a local buddy list that corresponds to the first client, and extracting information about at least one second client from the buddy list; and sending the first service data to the at least one second client according to the information about the at least one second client.

In an embodiment, the receiving, by the processor 1001, first service data that is sent by an instant messaging application-based first client, and sending the first service data to at least one second client that has a friend association relationship with the first client specifically includes the following blocks:

receiving, by the server, first service data that is sent by an instant messaging application-based first client, and receiving information about at least one second client that is selected by and that has a friend association relationship with the first client; and sending the first service data to the at least one second client according to the information about the at least one second client.

In an embodiment, the selection rule is: selecting a second client that is the first one to respond to the first service data.

When it is detected that a second client in the at least one second client responds to the first service data, the selecting, by the processor 1001, according to a preset selection rule, a target second client from the second client that responds to the first service data, and assigning a processing permission to the target second client specifically includes the following blocks:

when it is detected that a second client in the at least one second client responds to the first service data, determining the second client that is the first one to respond to the first service data as a target second client; and assigning a processing permission to the target second client, and sending prompt information that indicates no permission to a non-target second client in the at least one second client.

In an embodiment, after the receiving, by the processor 1001, the second service data that is sent by the target second client, using the target second client as a first client, and using the second service data as first service data, the processor 1001 further performs the following blocks:

when it is found that a quantity of clients that are used as the first clients reaches a preset quantity threshold, stopping sending and processing the first service data.

In an embodiment, the processor 1001 further performs the following blocks:

receiving a view request that is sent by a client that participates in processing the first service data, and sending, according to the view request, information about all clients that are used as the first clients to the client that participates in processing the first service data.

In this embodiment of the present disclosure, a server sends first service data that is sent by a first client to at least one second client that has a friend association relationship with the first client. When it is detected that a second client in the at least one second client responds to the first service data, the server can select, according to a preset selection rule, a target second client from the second client that responds to the first service data, and assign a processing permission to the target second client, so that the target second client generates second service data according to the processing permission and the first service data. Then, the server receives the second service data that is sent by the target second client, uses the target second client as a first client, and uses the second service data as first service data, so that first service data can be transmitted continually. In this way, more clients can participate in processing first service data, thereby improving utility of an instant messaging application and enhancing user stickiness.

A person of ordinary skill in the art may understand that all or some of the blocks of the method embodiments may be implemented by a computer program instructing relevant hardware. The program may be stored in a computer readable storage medium. When executed by a data processing device such as a server or a processor, the program causes a machine or a device to perform a procedure of each foregoing method embodiment. The computer readable storage medium may be a magnetic disk, an optical disc, a read-only memory (Read-Only Memory, ROM), a random access memory (Random Access Memory, RAM), or the like. In addition, the foregoing computer readable storage medium may further be various types of recording media that can be accessed by a computer apparatus by using a network or communication link, such as a recording medium from which data may be abstracted by using a router, the Internet, a local area network, or the like. In addition, the foregoing computer readable storage medium may refer to multiple computer readable storage media that are located, for example, in a same computer system, or may refer to multiple computer readable storage media that are distributed, for example, in multiple computer systems or computer apparatuses.

The foregoing descriptions are merely exemplary embodiments of the present disclosure, and are certainly not intended to limit the scope of the present disclosure. Therefore, any equivalent variations made according to the claims of the present disclosure shall also be encompassed in the scope of the present disclosure.

What is claimed is:

1. A data processing method, comprising:
   receiving, by a server comprising a memory and a processor in communication with the memory, first service data that is sent by a first client;
   sending, by the server, the first service data to at least one second client that has a friend association relationship with the first client;
   detecting, by the server, one or more second clients in the at least one second client responding to the first service data;
   selecting, by the server according to a selection rule, a target second client from the one or more second clients responding to the first service data;
   assigning, by the server, a processing permission to the target second client, so that the target second client generates second service data according to the processing permission and the first service data;
   sending, by the server, prompt information to each of non-target second clients to indicate that the non-target second clients are not given permission to process the first service data, wherein the non-target second clients comprise all clients among the at least one second client except the target second client;
   receiving, by the server, the second service data generated by the target second client;
   using, by the server, the target second client as a first client and using the second service data as first service data;
   receiving, by the server, a view request that is sent by a requesting client that participates in processing the first service data; and
   upon receiving the view request, sending, by the server, information about all clients that have participated in processing first service data except the requesting client and all first service data to the requesting client, so that the requesting client views the information and initiates a friend request according to the information.

2. The method according to claim 1, wherein the receiving, by the server, the first service data that is sent by the first client, and sending the first service data to the at least one second client that has the friend association relationship with the first client comprises:
   receiving, by the server, the first service data that is sent by the first client;

searching, by the server, for a buddy list that corresponds to the first client, and extracting information about the at least one second client from the buddy list; and sending, by the server, the first service data to the at least one second client according to the information about the at least one second client.

3. The method according to claim 1, wherein the receiving, by the server, the first service data that is sent by the first client, and sending the first service data to the at least one second client that has the friend association relationship with the first client comprises:

receiving, by the server, the first service data that is sent by the first client;

receiving, by the server, information about the at least one second client that is selected by and that has the friend association relationship with the first client; and sending, by the server, the first service data to the at least one second client according to the information about the at least one second client.

4. The method according to claim 1, wherein:

the selection rule comprises selecting a target second client that is the first one to respond to the first service data; and the selecting, by the server according to the selection rule, the target second client from the one or more second clients responding to the first service data and the assigning the processing permission to the target second client comprises:

determining, by the server, a second client of the one or more second clients that is the first one to respond to the first service data as the target second client; and assigning, by the server, the processing permission to the target second client.

5. The method according to claim 1, further comprising:

determining, by the server, whether a quantity of clients that are used as a first client reaches a preset quantity threshold;

when it is determined that the quantity of the clients that are used as the first client does not reach the preset quantity threshold and in responding to the using the target second client as the first client and using the second service data as the first service data, the method further comprising:

repeating, by the server, sending and processing the first service data; and when it is determined that the quantity of the clients that are used as a first client reaches the preset quantity threshold, stopping, by the server, sending and processing the first service data.

6. A server, comprising:

a memory storing instructions; and a processor in communication with the memory, wherein, when the processor executes the instructions, the processor is configured to cause the server to:

receive first service data that is sent by a first client;

send the first service data to at least one second client that has a friend association relationship with the first client;

detect one or more second clients in the at least one second client responding to the first service data;

select, according to a selection rule, a target second client from the one or more second clients responding to the first service data;

assign a processing permission to the target second client, so that the target second client generates second service data according to the processing permission and the first service data;

send prompt information to each of non-target second clients to indicate that the non-target second clients are not given permission to process the first service data, wherein the non-target second clients comprise all clients among the at least one second client except the target second client;

receive the second service data generated by the target second client;

use the target second client as a first client and use the second service data as first service data;

receive a view request that is sent by a requesting client that participates in processing first service data; and upon receiving the view request, send information about all clients that have participated in processing the first service data except the requesting client and all first service data to the requesting client, so that the requesting client views the information and initiates a friend request according to the information.

7. The server according to claim 6, wherein, when the processor is configured to cause the server to receive the first service data that is sent by the first client and send the first service data to the at least one second client that has the friend association relationship with the first client, the processor is configured to cause the server to:

receive the first service data that is sent by the first client;

search for a buddy list that corresponds to the first client, and extract information about the at least one second client from the buddy list; and send the first service data to the at least one second client according to the information about the at least one second client.

8. The server according to claim 6, wherein, when the processor is configured to cause the server to receive the first service data that is sent by the first client and send the first service data to the at least one second client that has the friend association relationship with the first client, the processor is configured to cause the server to:

receive the first service data that is sent by the first client;

receive information about the at least one second client that is selected by and that has the friend association relationship with the first client; and send the first service data to the at least one second client according to the information about the at least one second client.

9. The server according to claim 6, wherein:

the selection rule comprising selecting a target second client that is the first one to respond to the first service data; and when the processor is configured to cause the server to select, according to the selection rule, the target second client from the one or more second clients responding to the first service data and assign the processing permission to the target second client, so that the target second client generates the second service data according to the processing permission and the first service data, the processor is configured to cause the server to:

determine a second client of the one or more second clients that is the first one to respond to the first service data as the target second client; and assign the processing permission to the target second client.

10. The server according to claim 6, wherein, when the processor executes the instructions, the processor is configured to further cause the server to:

determine whether a quantity of clients that are used as a first client reaches a preset quantity threshold;

when it is determined that the quantity of the clients that are used as the first client does not reach the preset quantity threshold and in responding to that the processor is configured to cause the server to use the target second client as the first client and use the second service data as the first service data, perform the following:

repeating sending and processing the first service data; and when it is determined that the quantity of the clients that are used as a first client reaches the preset quantity threshold, stop sending and processing the first service data.

11. A non-transitory computer readable storage medium storing computer readable instructions, the computer readable instructions, when executed by a processor, causing the processor to perform:

receiving first service data that is sent by a first client;

sending the first service data to at least one second client that has a friend association relationship with the first client;

detecting one or more second clients in the at least one second client responding to the first service data;

selecting, according to a selection rule, a target second client from the one or more second clients responding to the first service data;

assigning a processing permission to the target second client, so that the target second client generates second service data according to the processing permission and the first service data;

sending prompt information to each of non-target second clients to indicate that the non-target second clients are not given permission to process the first service data, wherein the non-target second clients comprise all clients among the at least one second client except the target second client;

receiving the second service data generated by the target second client;

using the target second client as a first client and using the second service data as first service data;

receiving a view request that is sent by a requesting client that participates in processing first service data; and upon receiving the view request, sending information about all clients that have participated in processing the first service data except the requesting client and all first service data to the requesting client, so that the requesting client views the information and initiates a friend request according to the information.

12. The non-transitory computer readable storage medium according to claim 11, wherein, when the computer readable instructions cause the processor to perform the receiving the first service data that is sent by the first client, and sending the first service data to the at least one second client that has the friend association relationship with the first client, the computer readable instructions cause the processor to perform:

receiving the first service data that is sent by the first client;

searching for a buddy list that corresponds to the first client, and extracting information about the at least one second client from the buddy list; and sending the first service data to the at least one second client according to the information about the at least one second client.

13. The non-transitory computer readable storage medium according to claim 11, wherein, when the computer readable instructions cause the processor to perform the receiving the first service data that is sent by the first client, and sending the first service data to the at least one second client that has the friend association relationship with the first client, the computer readable instructions cause the processor to perform:

receiving the first service data that is sent by the first client;

receiving information about the at least one second client that is selected by and that has the friend association relationship with the first client; and sending the first service data to the at least one second client according to the information about the at least one second client.

14. The non-transitory computer readable storage medium according to claim 11, wherein:

the selection rule comprises selecting a target second client that is the first one to respond to the first service data;

when the computer readable instructions cause the processor to perform the selecting, according to the selection rule, the target second client from the one or more second clients responding to the first service data, and assigning the processing permission to the target second client, the computer readable instructions cause the processor to perform:

determining a second client of the one or more second clients that is the first one to respond to the first service data as the target second client; and assigning the processing permission to the target second client.

15. The non-transitory computer readable storage medium according to claim 11, wherein, the computer readable instructions, when executed by the processor, further cause the processor to perform:

determining whether a quantity of clients that are used as a first client reaches a preset quantity threshold;

when it is determined that the quantity of the clients that are used as the first client does not reach the preset quantity threshold and in responding to that the computer readable instructions cause the processor to perform using the target second client as the first client and using the second service data as the first service data, the computer readable instructions further cause the processor to perform:

repeating sending and processing the first service data; and when it is determined that the quantity of the clients that are used as a first client reaches the preset quantity threshold, stopping sending and processing the first service data.

* * * * *